United States Patent

Denneman et al.

Patent Number: 5,164,638
Date of Patent: Nov. 17, 1992

[54] LOW PRESSURE MERCURY DISCHARGE LAMP CIRCUIT ARRANGEMENT

[75] Inventors: Jan W. Denneman, Turnhout, Belgium; Leonardus U. E. Konings, Eindhoven, Netherlands

[73] Assignee: U.S. Philips Corporation, New York, N.Y.

[21] Appl. No.: 639,484

[22] Filed: Jan. 9, 1991

[30] Foreign Application Priority Data

Jan. 29, 1990 [NL] Netherlands ............ 9000199

[51] Int. Cl.$^5$ ............................................. H05B 41/36
[52] U.S. Cl. .................................. 315/224; 315/287; 315/307; 315/209 R
[58] Field of Search ............... 315/224, 287, 209 R, 315/307, DIG. 2, DIG. 4, DIG. 7, 289, 244, 225, 208

[56] References Cited

U.S. PATENT DOCUMENTS

| | | | |
|---|---|---|---|
| 4,156,166 | 5/1979 | Shapiro et al. | 315/224 X |
| 4,170,747 | 10/1979 | Holmes | 315/307 |
| 4,219,760 | 8/1980 | Ferro | 315/DIG. 4 X |
| 4,358,716 | 11/1982 | Cordes et al. | 315/DIG. 7 X |
| 4,412,154 | 10/1983 | Klein | 315/224 |
| 4,777,409 | 10/1988 | Tracy et al. | 315/224 X |
| 4,885,508 | 12/1989 | Krokaugger | 315/287 |
| 4,937,501 | 6/1990 | Ganser et al. | 315/209 R |
| 5,003,231 | 3/1991 | Perper | 315/307 X |
| 5,059,869 | 10/1991 | Albach et al. | 315/289 |

*Primary Examiner*—Eugene R. LaRoche
*Assistant Examiner*—Ali Neyzari
*Attorney, Agent, or Firm*—Edward Blocker

[57] ABSTRACT

A circuit arrangement suitable for operating a low pressure mercury discharge lamp by means of a high-frequency pulsatory current comprising circuitry for generating a high-frequency pulsatory current from a supply voltage with a modulator for modulating the high-frequency pulsatory current into a substantially square-wave shape voltage with a current amplitude A, a modulation frequency f and a duty cycle DC together with circuitry for adjusting the modulation frequency f and circuitry for adjusting the amplitude A and circuitry for adjusting the duty cycle DC.

14 Claims, 1 Drawing Sheet

LOW PRESSURE MERCURY DISCHARGE LAMP CIRCUIT ARRANGEMENT

The invention relates to a circuit arrangement suitable for operating a low-pressure mercury discharge lamp by means of a high-frequency pulsatory current, comprising circuitry for generating the high-frequency pulsatory current with an amplitude A from a supply voltage, a modulator for modulation into a substantially square-wave shape of the high-frequency pulsatory current with a modulation frequency f and a duty cycle DC.

A circuit arrangement as described in the opening paragraph is known from U.S. Pat. No. 4,219,760. In the known circuit arrangement, the luminous flux of the lamp can be adjusted through adjustment of the duty cycle DC. The lamp operated in this way has a relatively high luminous efficacy also at a low value of the duty cycle DC. If, however, neither the duty cycle DC, nor another parameter which characterizes the lamp current is adjustable, it is not possible to change the luminous flux of the lamp. In this case not only the luminous flux of the lamp, but also the colour point of the light radiated by the lamp is fixed. It is desirable in many applications, however, for the colour point of the lamp to be adjustable at a given luminous flux.

The invention has for its object to provide a circuit arrangement with which the colour point of the light radiated by the lamp at a given luminous flux is adjustable.

According to the invention, a circuit arrangement as described in the opening paragraph is for this purpose characterized in that the circuit arrangement is furthermore provided with circuitry for adjustment of the modulation frequency f.

It has been found that the colour point of the light radiated by the lamp can be adjusted over a considerable range through adjustment of the modulation frequency f.

The luminous flux of the lamp is only to a small degree dependent on the modulation frequency f, so that the luminous flux remains substantially constant in the case of a relatively big change of the modulation frequency f.

Very big changes of the modulation frequency f, however, lead to a change in the luminous flux of the lamp. This change can be counteracted by means of an adaptation of the amplitude A of the substantially square-wave modulated high-frequency pulsatory current.

In an advantageous embodiment of a circuit arrangement according to the invention, the circuit arrangement is provided with circuitry for adjusting the amplitude A of the substantially square-wave modulated high-frequency pulsatory current. This renders it possible to adjust besides the modulation frequency f also the amplitude A of the substantially square-wave modulated high-frequency pulsatory current for a constant value of the luminous flux of the lamp. The range over which the colour point can be adjusted for a constant value of the luminous flux of the lamp is increased by this.

It is also possible to adjust the luminous flux of the lamp over a considerable range through adjustment of either the amplitude A, or the amplitude A and the modulation frequency f.

In a further advantageous embodiment of a circuit arrangement according to the invention, the circuit arrangement is provided both with circuitry for adjusting the amplitude A and with circuitry for adjusting the duty cycle DC of the substantially square-wave modulated high-frequency pulsatory current.

This renders it possible to adjust not only the modulation frequency f and the amplitude A, but also the duty cycle DC of the substantially square-wave modulated high-frequency pulsatory current. The range over which the colour point can be adjusted at a constant luminous flux is thus increased. At the same time it is possible to make the position of the colour point of the light radiated by the lamp to a high degree independent of the value of the luminous flux of the lamp.

The substantially square-wave modulated high-frequency pulsatory current may be either unipolar or bipolar. In the former case it is usually desirable to commute the current through the lamp at a low frequency.

A circuit arrangement according to the invention is suitable for operating low-pressure mercury discharge lamps of various types, such as, for example, compact low-pressure mercury discharge lamps, conventional tubular low-pressure mercury discharge lamps and electrodeless low-pressure mercury discharge lamps.

The invention will be explained in more detail with reference to a drawing of an embodiment.

In the drawing

Figure 1:
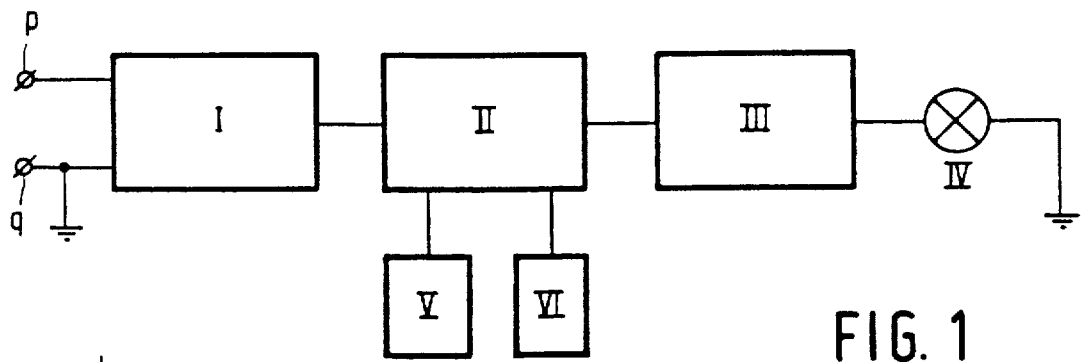
FIG. 1 shows a diagrammatic picture of the build-up of an embodiment of a circuit arrangement according to the invention and a lamp to be operated with it.

The build-up of the circuit arrangement according to the invention shown in FIG. 1 is as follows.

P and Q are connection terminals suitable for being connected to a supply voltage source. I represents a current source which generates a high-frequency pulsatory current from the supply voltage. An output of the current source I is connected to an input of modulator II, which modulates the amplitude of the high-frequency pulsatory current into substantially a square-wave shape with a modulation frequency f and a duty cycle DC. An output of modulator II is connected to an input of circuit arrangement III With Which an amplitude A of the substantially square-wave modulated current can be adjusted. A low-pressure mercury discharge lamp IV is connected between an output of the circuit arrangement III and an earth terminal. V and VI are a circuit arrangement for adjusting the duty cycle DC and a circuit arrangement for adjusting the modulation frequency f, respectively. An output of the circuit arrangement V for adjusting the duty cycle DC is connected to an input of modulator II, while similarly an output of the circuit arrangement VI for adjusting the modulation frequency f is connected to a further input of modulator II.

Figure 2:
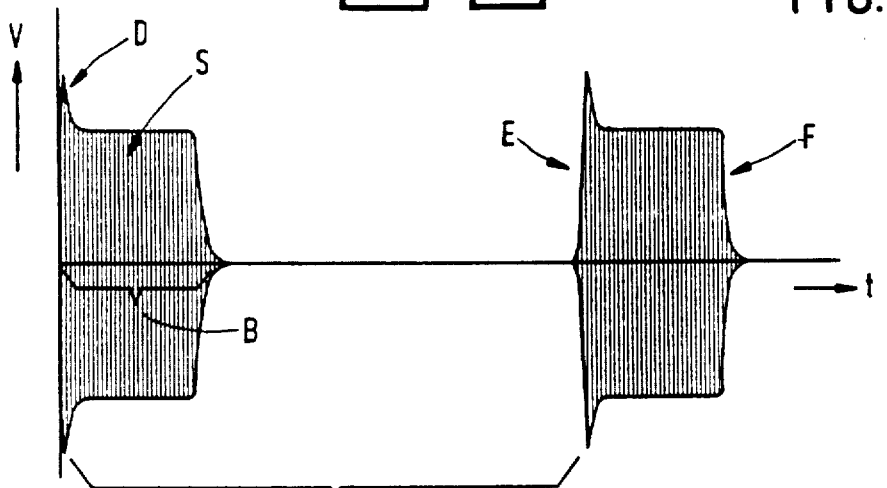
FIG. 2 shows the shape of a lamp voltage of a lamp operated with the circuit arrangement of FIG. I.

The lamp voltage of the lamp IV is shown in FIG. 2 as a function of time.

The time dimension is plotted on a horizontal axis and the voltage dimension on a vertical axis. S is a high-frequency substantially square-wave modulated voltage which is present across the lamp when the lamp is operated by means of a high-frequency substantially square-wave modulated pulsatory current. B is the width of one square wave and C is a cycle of the substantially square-wave modulation. The cycle C is related to a modulation frequency f in the following way: $C = 1/f$. The duty cycle DC is related to the square wave width B and the cycle C in the following way: $DC = B/C$. The square wave width B, cycle C, duty cycle DC, and modulation frequency f of the high-frequency substantially square-wave modulated pulsatory current across the lamp are equal to the corresponding quantities of the high-frequency substantially square-wave modulated pulsatory current. An increased amplitude of the high-frequency voltage pulses D is the result of the ignition of the lamp at the beginning of each square wave. E and F are a rising and a trailing edge, respectively, of the substantially square-wave modulation.

Table I lists a number of different colour point settings of the light radiated by the lamp IV, in this case an electrodeless low-pressure mercury lamp, for two different luminous flux values. The power P is given in the Table as a measure for the amplitude. This is the power consumed by the lamp if the duty cycle DC of the square-wave modulation is set for 100%.

The first three lines of the Table show three colour point settings which were realized by adjustment of the modulation frequency f while the luminous flux and the amplitude A remained constant. Since the luminous flux of the lamp is only to a small degree dependent on the modulation frequency f, it is possible to vary the modulation frequency f over a relatively wide range without the luminous flux of the lamp being substantially influenced by this. The last two lines of the Table show two colour point settings which were realized by adjustment of both the amplitude A and the modulation frequency f while the luminous flux of the lamp remained constant.

Table I illustrates the possibility of varying the colour point of the light radiated by the lamp over a wide range at a chosen value of the luminous flux by adjustment of either the modulation frequency f or the modulation frequency f and the amplitude A.

TABLE I

| luminous Flux (l m) | modul. freq. f (kHz) | power P (W) | duty cycle DC % | X-coord of colour point | Y-coord of colour point |
|---|---|---|---|---|---|
| 1000 | 0.5 | 75 | 15 | 0.362 | 0.385 |
| 1000 | 2 | 75 | 15 | 0.367 | 0.391 |
| 1000 | 5 | 75 | 15 | 0.369 | 0.404 |
| 3000 | 1 | 100 | 48 | 0.340 | 0.373 |
| 3000 | 20 | 75 | 48 | 0.352 | 0.384 |

The lamp was provided with a spherical lamp vessel having a diameter of approximately 110 mm, into which argon was introduced with a filling pressure of 33 Pa (at 300 K). A quantity of amalgam consisting of mercury, bismuth and indium was also present in the lamp vessel. The wall of the lamp vessel was provided with a luminescent layer comprising a mixture of red luminescing yttrium oxide activated by Eu (3+), green luminescing cerium-magnesium aluminate activated by Tb (3+) and blue luminescing barium-magnesium aluminate activated by Eu (2+). The frequency of the high-frequency current pulses was 2.65 MHz. The results shown in FIG. 3 were obtained with the same lamp.

Figure 3:
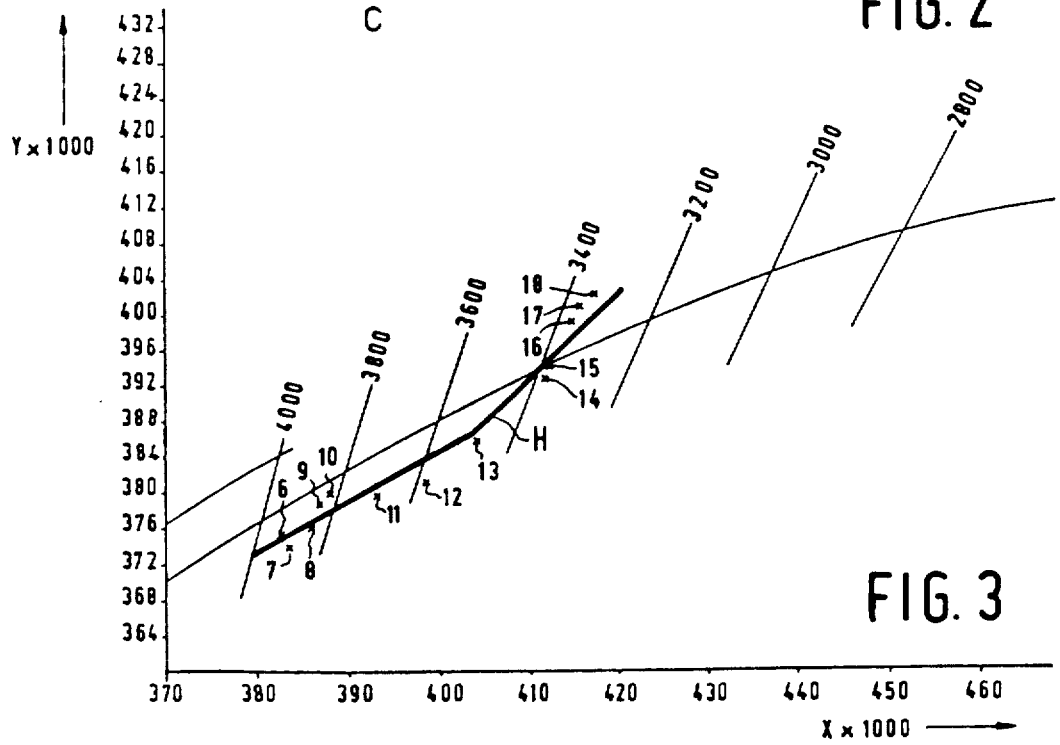
FIG. 3 shows various colour point settings of the lamp operated with the circuit arrangement of FIG. 1 at a given luminous flux.

FIG. 3 shows various colour point settings of the lamp at the same luminous flux.

In FIG. 3, the points 6 to 18 are different colour points of the light radiated by the lamp realized at a constant luminous flux of 1000 lumens through adjustment of the duty cycle DC, the modulation frequency f, and the amplitude A of the substantially square-wave modulated high-frequency pulsatory current.

The curve H approximates the path over which the colour point was varied. In the present case such settings of the three parameters were chosen that each colour point on the curve H is experienced by the human eye as a pleasant colour, while following of the curve H from left to right corresponds to a transition from "cool white" to "warm white" light. The curve H illustrates the possibility of adjusting the colour point over a wide range for a given luminous flux of the lamp.

We claim:

1. A circuit arrangement suitable for operating a low pressure mercury discharge lamp by means of a high-frequency pulsatory current, comprising circuitry for generating the high-frequency pulsatory current from a supply voltage, a modulator for modulating the high-frequency pulsatory current into a substantially square-wave shaped voltage with an amplitude A, a modulation frequency f and a duty cycle DC, said circuit arrangement being provided with circuitry for adjusting the frequency of the substantially square-wave shaped modulated voltage and with means for applying an adjusted square-wave shaped voltage to said lamp.

2. A circuit arrangement as claimed in claim 1, also including circuitry for adjusting the amplitude A of said square-wave shaped voltage, and wherein said means for applying applies an adjusted square-wave shaped voltage which has had its frequency and amplitude adjusted.

3. A circuit arrangement as claimed in claim 2 also including circuitry for adjusting the duty cycle DC and wherein said means for applying applies an adjusted square-wave shaped voltage which has had its frequency, amplitude and duty cycle adjusted.

4. A method for controlling the color point of a low pressure mercury discharge lamp, said method comprising generating a high-frequency pulsatory current from a supply voltage, modulating the high-frequency pulsatory current into a substantially square-wave shaped voltage with an amplitude A, a modulation frequency f and a duty cycle DC, said method including adjusting the frequency of the substantially square-wave shaped voltage and applying said adjusted voltage to said lamp appropriately to obtain a selected color point.

5. A method in accordance with claim 4, said method also including adjusting the amplitude A of the substantially square-wave shaped voltage before applying said adjusted voltage to said lamp.

6. A method in accordance with claim 5, said method also including adjusting the duty cycle DC of the substantially square-wave shaped modulated voltage before applying said adjusted voltage to said lamp.

7. A method for increasing the range through which the color point of a low pressure mercury discharge lamp can be adjusted, said method comprising generating a high-frequency pulsatory current from a supply voltage, modulating the high-frequency pulsatory current into a substantially square-wave shaped voltage with a current amplitude A, a modulation frequence f and a duty cycle DC, said method including adjusting the frequence of the substantially square-wave shaped voltage and applying said adjusted voltage to said lamp appropriately to obtain a selected color point.

8. A method for increasing the range through which the color point of a low pressure mercury discharge lamp can be adjusted according to claim 7, said method also including adjusting the amplitude A of the substantially square-wave shaped voltage appropriately before applying said adjusted voltage to said lamp to obtain a selected color point.

9. A method for increasing the range through which the color point of a low pressure mercury discharge lamp can be adjusted in accordance with claim 8, said method also including adjusting the duty cycle DC of the substantially square-wave shaped voltage before applying said adjusted voltage to said lamp.

10. A method for controlling the color point of a low pressure mercury discharge lamp, said method comprising generating a high frequency pulsatory current from a supply voltage, modulating the high frequency pulsatory current into a substantially square-wave shaped voltage with an amplitude A, a modulation frequency f and a duty cycle DC, said method including increasing the modulation frequency f and thereafter applying said substantially square-wave shaped voltage with said increased modulation frequency to said lamp whereby both coordinates of the color point are increased.

11. A method for controlling the color point of a low pressure mercury discharge lamp, said method comprising generating a high frequency pulsatory current from a supply voltage, modulating the high frequency pulsatory current into a substantially square-wave shaped voltage with an amplitude A, a modulation frequency f and a duty cycle DC, said method including increasing the modulation frequency f and increasing the amplitude A of the substantially square-wave shaped voltage and therefater applying said substantially square-wave shaped adjusted voltage to said lamp whereby both coordinates of the color point are decreased.

12. A method for controlling the color point of a low pressure mercury discharge lamp according to claim 11, said method also including increasing the duty cycle Dc of the substantially square-wave shaped voltage before applying said substantially square-wave shaped voltage to said lamp whereby both coordinates of the color point are decreased.

13. A method for controlling the color point of a low pressure mercury discharge lamp, said method comprising generating a high frequency pulsatory current from a supply voltage, modulating the high frequency pulsatory current into a substantially square-wave shaped voltage with an amplitude A, a modulation frequency f and a duty cycle DC, said method including increasing the duty cycle DC of the substantially square-wave shaped voltage and said method also including increasing the amplitude A of the substantially square-wave shaped voltage and thereafter applying said substantially square-wave shaped voltage to said lamp whereby both coordinates of the color point are decreased.

14. A method for controlling the color point of a low pressure mercury discharge lamp, said method comprising generating a high frequency pulsatory current from a supply voltage, modulating the high frequency pulsatory current into a substantially square-wave shaped voltage with an amplitude A, a modulation frequency f and a duty cycle DC, said method including increasing the amplitude A of the substantially square-wave shaped voltage and thereafter applying said substantially square-wave shaped voltage to said lamp whereby both coordinates of the color point are decreased.

* * * * *

UNITED STATES PATENT AND TRADEMARK OFFICE
CERTIFICATE OF CORRECTION

PATENT NO. : 5,164,638
DATED : Nov. 17, 1992
INVENTOR(S) : Denneman et al.

It is certified that error appears in the above-indentified patent and that said Letters Patent is hereby corrected as shown below:

Column 6, line 5, change "Dc" to --DC--.

Signed and Sealed this

Twenty-third Day of July, 1996

Attest:

BRUCE LEHMAN

Attesting Officer

Commissioner of Patents and Trademarks